Aug. 21, 1951     M. FLADMARK     2,565,173
PROCESS FOR THE MANUFACTURE OF OIL AND FOOD PRODUCTS
FROM HERRINGS, WHALES, AND OTHER SEA ANIMALS
Filed Feb. 25, 1946
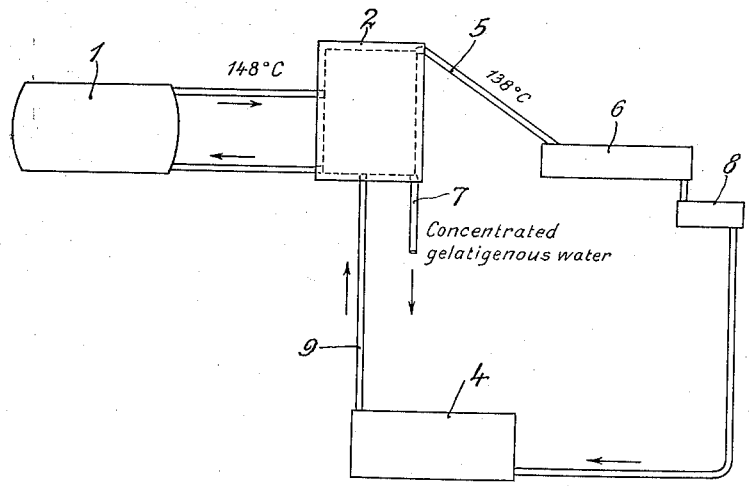
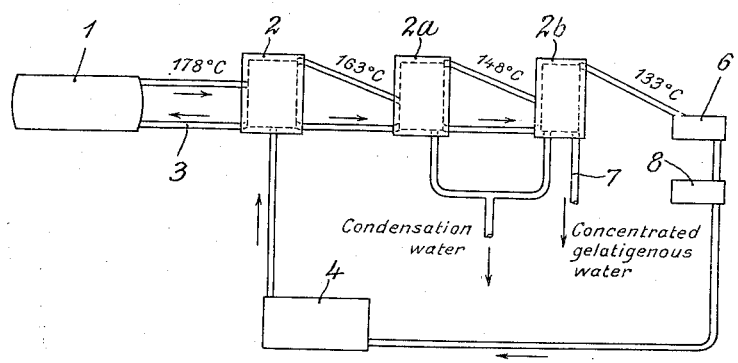
Inventor
M. Fladmark
By
Wenderoth, Lind & Ponack
Attorneys Patented Aug. 21, 1951

2,565,173

UNITED STATES PATENT OFFICE 2,565,173

PROCESS FOR THE MANUFACTURE OF OIL AND FOOD PRODUCTS FROM HERRINGS, WHALES, AND OTHER SEA ANIMALS

Morten Fladmark, Oslo, Norway

Application February 25, 1946, Serial No. 650,104
In Norway October 9, 1943

2 Claims. (Cl. 99—2)

The present invention relates to the treatment of herrings and other fishes as well as whales and other sea mammals to produce keepable foodstuffs and oil therefrom.

In the conventional processes for the manufacture of oil and cattle food from herrings and the like, the raw material is first subjected to a heating or cooking operation in apparatus constructed for this special purpose. This heating or cooking operation is usually carried out by introducing steam into the material. The so pretreated material is then passed to a press in which the liquid is separated from the solids. The press cake is thereupon usually passed through a disintegrator and then to a suitable drying apparatus.

In the treatment of whale meat or other parts of whales, the liquid containing the oil is mostly separated from solids from the preparatory heating or digestion by decantation or straining, but of late presses are also made use of to separate the liquid from the solids.

Regardless of the character of the raw material (herrings, whale meat or the like), the oil contained in the obtained liquid is separated from the gelatigenous water called "glue water," usually by means of centrifugal separators. The remaining "glue water" contains a considerable proportion of the valuable constituents of the initial material capable of being used for the manufacture of cattle food, glue, food extracts and the like. For this reason it is of great economic importance to utilize the said "glue water."

Various methods have been suggested to utilize the valuable constituents of "glue waters." According to most of these methods the glue waters are evaporated to a high degree of concentration or to a dry solid product. The great amount of fuel required to evaporate the dilute glue water (containing usually not more than about 5% of solids) has been a hindrance to the economically profitable use of the methods hitherto suggested. For these reasons the glue water is considered a waste product of no value. According to the present invention, an economically profitable utilization of the glue water is rendered possible by operations involving a greatly reduced consumption of heat.

An important feature of the method according to the invention consists in carrying out the preparatory heat treatment of the raw material (herrings, whale meat and the like) by means of steam in cooperative combination with the evaporation of the glue water, preferably under pressure, the vapours from the last named operation being introduced into the heating or cooking apparatus. This combination of operations has not in itself been obvious to the manufacturer in question owing to the special conditions prevailing in this industry, the nature of the raw materials and the types of apparatus hitherto employed to carry out the various operations involved.

In a preferred embodiment of the invention the glue water is introduced into an evaporation apparatus operating under high pressure and heated by means of steam, preferably pressure steam, for example from an ordinary steam boiler. The exhaust steam from the pressure evaporation of glue water is then passed at a suitable temperature and pressure to the heating apparatus or cooker (digester) for the raw material (herrings, whale meat or the like). The water of condensation from the pressure evaporator may be returned to the steam boiler.

The pressure evaporation of the glue water may be carried into effect in a single or in a plurality of steps in accordance with the amount of steam needed for the heating or cooking of the raw material and with the quantity of glue water to be evaporated.

By this method of operation two important advantages are attained. These advantages are due firstly to the fact that the generation of cooking steam and the evaporation of the glue water takes place in one and the same operation. It is practically correct to say that by this way of generating the cooking steam, the evaporation of the glue water will be attained without cost or at least without a substantial increase in the fuel expenses.

Another important advantage attained by the operation of a plant as that above outlined consists therein that no supply of fresh water is needed for the steam cooking or heating of the raw materials. The water required for generation of steam for the cooking operation is supplied through the raw materials, from which it is obtained in the form of glue water. This water and the steam generated therefrom will thus in part pass into the cycle of operations from the press, after the press liquid has been purified and the oil separated off, then through the pressure evaporator and therefrom in the form of steam back to the cooker.

Water leaves the system in part as steam to the cooker and in part through the concentrated glue water, which may contain for example 50% water.

As will be apparent from the above, no special supply of fresh water is needed for the steam generator, preferably an ordinary steam boiler, because the water of condensation from the pressure evaporator can be returned to the steam boiler. The fresh water problem for the herring oil and meal factories, as well as for the whale stations, is always of imperative importance. From natural reasons factories of this type are situated onboard ships in the open sea or at the coast where fresh water is difficult to obtain. In view of this fact the advantages involved in the evaporation of the glue water and the utilization of the resulting vapours according to the invention in factories of this type will be readily understood.

In floating factories it is obvious that it is always of great advantage that no special production of fresh water is needed. In such factories fresh water must be produced by distillation from sea water.

The glue water evaporation plant may be of ordinary construction and may for example consist of an apparatus with tubes surrounded by the heating medium, such as steam under pressure. The glue water may be supplied to the evaporation apparatus at the top or at the bottom of same.

The pressure evaporation may take place in one or more stages. The invention is illustrated by way of example in the accompanying drawing in which Fig. 1 is a diagrammatic view of a plant suitable for carrying the invention into effect. Fig. 2 is a diagrammatic view of a modified arrangement of apparatus elements.

In Fig. 1 the reference numeral 1 designates a steam boiler for the generation of pressure steam, which passes to the pressure evaporator 2 for glue water. The temperature of the steam entering the pressure evaporator may be for example about 148° C. At the bottom of the pressure evaporator water of condensation is collected, and this water is returned to the steam boiler 1 through pipe 3.

In the pressure evaporator the glue water is concentrated, and the vapour (steam) is passed therefrom through pipe 5 with a temperature of for example 133° C. to the cooker 6, where the raw material is cooked (digested) or heated, respectively. The glue water here produced is passed to a container 4, and therefrom through pipe 9 to the pressure evaporator 2, after first having passed through a press 8, and after having been subjected to conventional purification treatments. The concentrated glue water leaves the pressure evaporator 2 through pipe 7. The glue water may at this stage have been concentrated to a percentage of solids of for example about 50%.

In the example illustrated in Fig. 2, the plant comprises three pressure evaporators where the vapour (steam) evolved from the glue water in the evaporator 2 is passed to the heat tubes in evaporator 2a, where it is condensed. The glue water preconcentrated in evaporator 2 is passed to the evaporator 2a, where it is further concentrated. The exhaust vapours (steam) from the glue water evaporation in evaporator 2a are passed to the heat tubes in evaporator 2b, where they are condensed. The glue water further concentrated in evaporator 2a is passed to the evaporator 2b, where it is further concentrated. The exhaust vapours (steam) from the glue water evaporation in evaporator 2b is passed to the cooker (or heater) 6 for cooking (or heating, respectively) of the initial material. The finally concentrated glue water is drawn off from the evaporator 2b.

Water of condensation from 2a and 2b is contaminated and should not be used as feed water for the steam generator, but owing to its comparatively high temperature it can with advantage be employed for example for preheating of glue water before it is passed to the evaporator 2. Water of condensation from the evaporator 2 may be returned to the steam generator, whereby a saving in fresh water to the steam generator is attained.

The concentrated glue water produced according to the invention may be converted into a dry product by any suitable means, for example by the known method of atomizing in hot gas or by drum drying, and it may be under vacuum.

The dried glue water may suitably be converted into a keeping product by a treatment according to applicant's Norwegian Patent No. 61,951, consisting in evaporating the glue water to a solid product, which is then mixed with a moist or dry material of the same kind as that from which the glue water has been separated off, such as for example moist or dry press cakes from herring oil factories.

Besides carrying out the pressure evaporation in one or more stages, the pressure evaporation of the glue water, when desired, may also be combined with evaporation at atmospheric pressure or under reduced pressure. Compression of the produced vapours will then in many instances be necessary.

It may be of advantage to combine vacuum evaporation with pressure evaporation, when a preconcentrated glue water has a tendency to become sticky and to adhere to the heat tubes of the evaporators.

The preconcentrated glue water may then, as it is desired, be taken out from the first, second or third pressure evaporator and introduced into the vacum evaporator, where the temperature on the surface of the heating tubes is lower than in the pressure evaporator.

The concentrated glue water obtained by the methods above described, when it is to be converted into a solid state, may also—as in itself known—be directly mixed with moist press cakes before it is introduced into the conventional drier, such as a hot air drier.

The products produced according to the invention may be employed as cattle food, cement, soup extracts and the like.

I claim:

1. In the treatment of herring and other fishes as well as portions of whale and other sea mammal bodies to manufacture oil, cattle food and other products therefrom, the method which comprises the steps of heating the raw material directly with tolerably pure pressure steam at an elevated temperature to obtain a liquid extract of oils and soluble matters, separating said liquid extract from the solid residue and the oil fraction of said extract from the so-called "glue water" fraction thereof, evaporating the separated "glue water" indirectly with steam at a higher pressure than required at said heating operation and in successive stages, the number of evaporating stages being fixed to the minimum number which is necessary to attain generation of tolerably pure steam in the last stage and using such steam from the last evaporating stage to carry out said heating operation.

2. In the treatment of herrings and other fishes as well as portions of whales and other sea mammal bodies to manufacture oils, cattle foods and other useful products therefrom the method which comprises the steps of heating the raw material directly with tolerably pure pressure steam to obtain an aqueous extract containing oil, separating said aqueous liquid from oil and solid residue, evaporating the separated aqueous liquid, the so-called "glue-water" indirectly with steam at a higher pressure than that at which the said heating of the said raw material is to be carried out, the said evaporation being carried out in a plurality of stages, the steam supply for the first evaporation stage being substantially covered by steam regenerating from return condensate from the stages wherein there are liberated secondary vapours, which are passed as heating steam to the next stage and using the waste vapours as obtained in tolerably pure condition from the last evaporation stage for carrying out said heating operation, whereby steam and water are carried through closed cycles of operation to practically eliminate any need of additional heat units for the evaporation and of fresh water for steam generation.

MORTEN FLADMARK.

REFERENCES CITED

The following references are of record in the file of this patent:

UNITED STATES PATENTS

| Number | Name | Date |
| --- | --- | --- |
| 408,824 | Cazin | Aug. 13, 1889 |
| 1,501,513 | Boberg | July 15, 1924 |
| 2,292,769 | Pattee | Aug. 11, 1942 |
| 2,403,174 | Ernst | July 2, 1946 |